Nov. 2, 1937. E. W. DAVIS 2,097,871
LUBRICATING APPARATUS
Filed Jan. 30, 1935
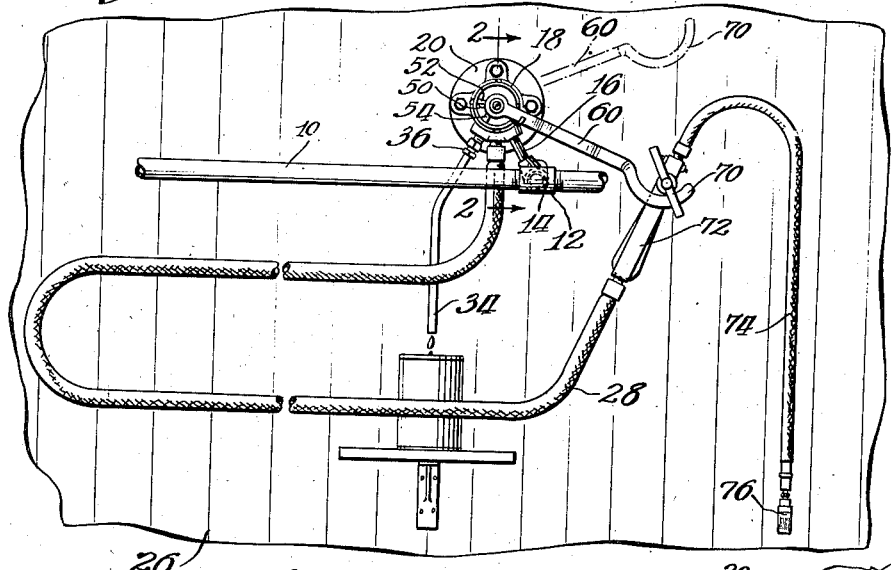
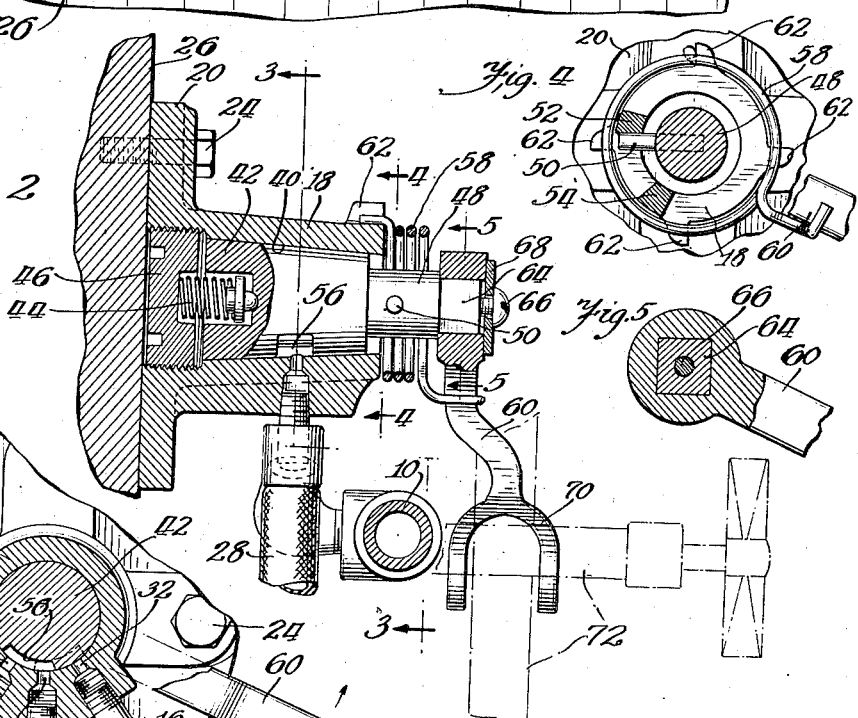
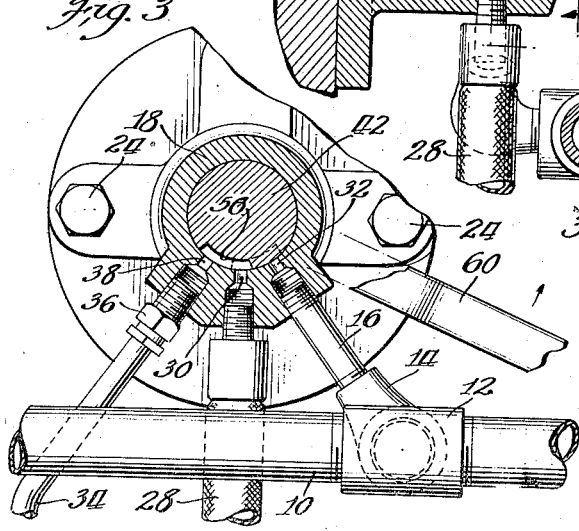
Inventor:
Ernest W. Davis
By Williams, Bradbury,
McCaleb & Hinkle, Attys.

Patented Nov. 2, 1937

2,097,871

UNITED STATES PATENT OFFICE 2,097,871

LUBRICATING APPARATUS

Ernest W. Davis, Oak Park, Ill., assignor to Stewart-Warner Corporation, Chicago, Ill., a corporation of Virginia Application January 30, 1935, Serial No. 4,073

4 Claims. (Cl. 221—47.1)

My invention relates generally to lubricating apparatus, and more particularly to an improved automatic shut-off and pressure relief valve for lubricating service stations.

In many of the larger service stations equipped for the lubrication of automotive vehicles, it is common to pipe lubricant under high pressure to the various greasing pits from a central high pressure lubricant compressor. At each of the greasing stations are located one or more flexible conduits, each provided with a coupler for making a detachable connection with the lubricant receiving fittings on the automobile being lubricated, and with a valve manually operable to control the flow of lubricant, through the flexible conduit. It is desirable that when the flexible conduits are not in use, they be disconnected from the high pressure lubricant supply line, and have the pressure therein relieved, thus greatly extending the life of the flexible conduit. Normally this can be done only by manually turning off a valve at the juncture of the flexible conduit with the supply line and thereafter opening the valve in the flexible discharge conduit to relieve the lubricant pressure therein.

The latter operation is time consuming and results in wastage of lubricant whenever the control valve in the flexible conduit is opened to relieve the lubricant pressure, for due to the fact that grease and other lubricants usually contain small amounts of trapped air, and due to the fact that the flexible conduits are slightly elastic, a considerable amount of lubricant is exuded from the coupler whenever the control valve in the flexible conduit is opened, even though its connection with the supply line be cut off.

Furthermore, the operation of relieving the pressure in the discharge line is frequently neglected by careless service station attendants.

It is therefore the object of the present invention to provide improved means for semi-automatically closing the valve connecting the flexible discharge conduit with the source of lubricant under pressure and at the same time relieve the lubricant pressure in said conduit.

Other objects will appear from the following description, reference being had to the accompanying drawing, in which Fig. 1 is an elevation more or less diagrammatically illustrating my invention;

Fig. 2 is a sectional view taken on the line 2—2 of Fig. 1 showing the details of the three-way valve;

Fig. 3 is a transverse sectional view of the three-way valve taken on the line 3—3 of Fig. 2;

Fig. 4 is a transverse sectional view taken on the line 4—4 of Fig. 3 showing the three-way valve limit stops; and Fig. 5 is a transverse sectional view taken on the line 5—5 of Fig. 2, showing the connection of the handle to the plug of the three-way valve.

Fig. 1 represents the installation of my invention upon the side wall of a greasing pit of an automotive vehicle service station, the lubricant being supplied from a suitable source under high pressure through a pipe 10, the latter being connected by a suitable T 12, street L 14, and nipple 16 to the body 18 of a three-way valve. The body 18 has a plurality of lugs 20 which receive screws 24 or other suitable means by which the body is fastened to the wall 26.

A flexible discharge conduit 28 is connected to the body 18 of the three-way valve, communicating with port 30 thereof (Fig. 3) which is located adjacent a port 32 which communicates with the nipple 16. A drain pipe 34 is likewise connected to the body 18 of the three-way valve by a suitable coupling 36, the latter communicating with a port 38 of the three-way valve.

The body 18 of the three-way valve is provided with a tapered bore 40 to receive a complementally shaped plug 42, the latter being held snugly in the bore by a compression coil spring 44 which is located in suitable recesses formed in the valve plug 42 and in a closure plug 46 which is threaded in the end of the body 18. The stem portion 48 of the plug 42 has a pin 50 extending radially therefrom, movement of the valve plug 42 being limited by engagement of this pin 50 with one or the other of lugs 52, 54 formed integrally with the body 18.

The valve plug 42 is normally held in the position shown in Fig. 3, with its recess 56 connecting ports 30 and 38, by a torsion spring 58, one end of which is hooked over an actuating arm 60, the other end being anchored behind one of a plurality of lugs 62 formed on the body 18. The arm 60 has a square socket fitting over the squared end 64 of the plug stem 48, being secured thereto by a screw 66 and washer 68. The outer end of the arm 60 is bifurcated to form a hook 70 adapted to receive a control valve 72. The control valve 72 is secured to the end of the flexible conduit 28 and has secured thereto a flexible discharge hose 74 which at its extremity carries a coupler 76 by which the connection with the lubricant receiving fittings may be made.

When the operator commences the lubrication of a vehicle he will remove the control valve 72 from the hook 70 of the arm 60, whereupon the torsion spring 58 will swing the arm 60 upwardly to the position in which it is shown in dotted lines in Fig. 1. In this position the recess 56 in the valve plug 42 will lie in the position indicated in dotted lines in Fig. 3 and connect the ports 30 and 32, thereby permitting flow of lubricant from the pipe 10 in which the lubricant is normally maintained under high pressure, into the discharge conduit 28. As the coupler 76 is successively connected to the various lubricant receiving fittings, the control valve 72 is operated to supply the required quantity of lubricant to each bearing.

Upon completion of the lubrication of the automobile, the service station attendant will again hang the control valve 72 on the hook 70, the weight thereof swinging the arm 60 downwardly from the dotted line position to the full line position (Fig. 1). When the arm 60 is in its lowermost position the recess 56 in the valve plug 42 will overlie the ports 30 and 38, and the supply of lubricant from the pipe 10 thus cut off, and the flexible conduit 28 connected to the drain pipe 34, thus relieving the lubricant pressure in the flexible conduit 28. The pipe 34 may drain into any suitable receptacle and the lubricant collected therein subsequently used.

While I have shown and described but a single embodiment of my invention, it will be apparent to those skilled in the art that various slight changes and modifications may be made therein without departing from the invention as defined in the following claims.

I claim:

1. In a high pressure lubricating system, the combination of a source of lubricant under pressure, a conduit for making a connection with a part to be lubricated, capable of withstanding high lubricant pressure, a manually operated valve in the conduit whereby lubricant may be supplied to said part while it is connected to said conduit, a movable support for said conduit, and a three way valve for alternatively connecting said conduit to said source and to the atmosphere, said valve being operable by the weight of said conduit on said support for relieving the pressure in said conduit, and resilient means to move said valve to a position connecting said source and said conduit when the weight of said conduit is removed from said support.

2. In a high pressure lubricating system, the combination of a source of lubricant under pressure, a three-way valve having one of the ports thereof connected to said source, the second port being connected to the atmosphere, a conduit capable of withstanding high lubricant pressures, connected to the third port of said valve, and having means for making a detachable connection with a part to be supplied with lubricant, a manually operated valve in the conduit whereby lubricant may be supplied to said part while it is connected with said conduit, and a member for supporting said conduit, said member being operatively connected with said valve to cause said valve to relieve the pressure on said conduit by connecting said conduit with the atmosphere when the conduit is supported by said member, and to connect said conduit to said source when the conduit is removed from said member.

3. In a high pressure lubricating system, the combination of a flexible conduit capable of withstanding high lubricant pressures, a coupler at one end of said conduit for detachably connecting the conduit with lubricant receiving fittings applied to the parts to be lubricated, a manually operated valve in the conduit whereby lubricant may be supplied to a fitting while it is connected to said coupler, a source of lubricant under pressure, a support for said conduit, and a three-way valve actuated by movement of said support, said three-way valve being arranged to connect said source with said conduit when the latter is removed from said support, and to relieve the pressure on said conduit by connecting said conduit with the atmosphere when the conduit rests upon said support.

4. In a high pressure lubricating system having a flexible discharge conduit, capable of withstanding high lubricant pressures, with a coupler at its end for making a detachable connection with a part to be lubricated, a manually operated valve in the conduit whereby lubricant may be supplied to said part while it is connected to said coupler, a conduit-protecting device comprising a movable support for the conduit, a valve actuated by the support when it receives the conduit to disconnect the conduit from the high pressure system and to vent it to the atmosphere for relieving the pressure in said conduit, and means for actuating the valve to connect the conduit with the high pressure system when the conduit is removed from the support.

ERNEST W. DAVIS.